United States Patent
Kim et al.

(10) Patent No.: US 11,953,983 B2
(45) Date of Patent: Apr. 9, 2024

(54) ELECTRONIC DEVICE AND METHOD FOR INITIALIZING ELECTRONIC DEVICE

(71) Applicant: SAMSUNG ELECTRONICS CO., LTD., Suwon-si (KR)

(72) Inventors: Byungchul Kim, Suwon-si (KR); Kiseok Kim, Suwon-si (KR); Mingyu Kim, Suwon-si (KR); Jaemin Oh, Suwon-si (KR); Sanghyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/885,216

(22) Filed: Aug. 10, 2022

(65) Prior Publication Data

US 2022/0382624 A1 Dec. 1, 2022

Related U.S. Application Data

(63) Continuation of application No. PCT/KR2021/001589, filed on Feb. 5, 2021.

(30) Foreign Application Priority Data

Feb. 10, 2020 (KR) .................. 10-2020-0015950

(51) Int. Cl.
*G06F 11/00* (2006.01)
*G06F 9/4401* (2018.01)
*G06F 11/07* (2006.01)

(52) U.S. Cl.
CPC .......... *G06F 11/0793* (2013.01); *G06F 9/441* (2013.01); *G06F 11/073* (2013.01)

(58) Field of Classification Search
CPC .................................. G06F 11/1417
See application file for complete search history.

(56) References Cited

U.S. PATENT DOCUMENTS 6,539,474 B2 * 3/2003 Matsuura ............ G06F 11/1417
714/E11.133
7,730,295 B1 * 6/2010 Lee ..................... G06F 9/4401
713/1

(Continued)

FOREIGN PATENT DOCUMENTS

KR 10-0608796 B1 8/2006
KR 10-2007-0008997 A 1/2007
(Continued)

OTHER PUBLICATIONS

International Search Report dated May 17, 2021 issued by the International Searching Authority in counterpart International Application No. PCT/KR2021/001589 (PCT/ISA/210).
(Continued)

*Primary Examiner* — Amine Riad
(74) *Attorney, Agent, or Firm* — Sughrue Mion, PLLC

(57) ABSTRACT

The present disclosure refers to apparatuses and methods for initializing electronic devices. An electronic device according to various embodiments includes a memory, and a processor operatively connected to the memory. The processor is configured to record, in the memory, software binaries received from an external device during a download mode. The processor is further configured to, when the download mode has ended, perform booting in a normal mode using a bootloader based on a determination indicating that a predetermined software binary is present among the software binaries recorded in the memory, and perform booting in a recovery mode using the bootloader based on the determination indicating that the predetermined software binary is absent from among the software binaries recorded in the memory.

20 Claims, 8 Drawing Sheets

(56) References Cited

U.S. PATENT DOCUMENTS

| | | | |
|---|---|---|---|
| 9,886,264 B2 | 2/2018 | Meng et al. | |
| 2001/0020263 A1* | 9/2001 | Matsuura | G06F 9/24 |
| | | | 714/E11.133 |
| 2012/0291021 A1 | 11/2012 | Banerjee et al. | |
| 2016/0188430 A1* | 6/2016 | Nitta | G06F 11/2094 |
| | | | 714/6.3 |
| 2017/0286091 A1* | 10/2017 | Jepson | G06F 9/4408 |
| 2021/0004240 A1 | 1/2021 | Lee et al. | |
| 2021/0034354 A1 | 2/2021 | Lee et al. | |

FOREIGN PATENT DOCUMENTS

| | | |
|---|---|---|
| KR | 10-2016-0084304 A | 7/2016 |
| KR | 10-2019-0105808 A | 9/2019 |
| KR | 10-2019-0109979 A | 9/2019 |

OTHER PUBLICATIONS

International Written Opinion dated May 17, 2021 issued by the International Searching Authority in counterpart International Application No. PCT/KR2021/001589 (PCT/ISA/237).

\* cited by examiner

ELECTRONIC DEVICE AND METHOD FOR INITIALIZING ELECTRONIC DEVICE

CROSS-REFERENCE TO RELATED APPLICATIONS

This application is a continuation application of International Application No. PCT/KR2021/001589, filed on Feb. 5, 2021, which claims priority to Korean Patent Application 10-2020-0015950, filed on Feb. 10, 2020, in the Korean Intellectual Property Office, the disclosures of which are incorporated by reference herein in their entireties.

BACKGROUND

1. Field

The present disclosure relates to an electronic device and, more particularly, to a method for initialization after recording a software binary in an electronic device.

2. Description of Related Art

With the development of mobile communication and hardware/software technologies, it has become possible to incorporate various functions in portable electronic devices (hereinafter, referred to as an "electronic device") represented by smartphones. An electronic device may store various software in a memory, and a software binary (or system software), such as a bootloader, an operating system, and a device driver, may be written or flashed in a predetermined area of the memory.

A software binary may be initially recorded in a memory of an electronic device during a process of the electronic device, and thereafter, a user may update the software binary by using an update tool in another device connected to the electronic device. In order to use an electronic device after initial recording or updating of such system software, a reboot process is required.

For system initialization after recording a software binary, a conventional electronic device boots in a recovery mode and then reboots in a normal mode.

Since it takes time until initial booting due to booting in the recovery mode, a high cost in time may occur in the process of producing a large number of electronic devices.

Various embodiments of the present disclosure provide an efficient initialization method capable of reducing a cost in time when an electronic device records a software binary in a memory as described above.

SUMMARY

According to an aspect of the present disclosure, there is provided an electronic device that includes a memory and a processor operatively connected to the memory. The processor is configured to record, in the memory, software binaries received from an external device during a download mode. The processor is further configured to, when the download mode has ended to perform booting in a normal mode using a bootloader based on a determination indicating that a predetermined software binary is present among the software binaries recorded in the memory, and to perform booting in a recovery mode using the bootloader based on the determination indicating that the predetermined software binary is absent from among the software binaries recorded in the memory.

In some embodiments, the processor is further configured to, when the booting using the bootloader is initiated, select at least one of the normal mode and the recovery mode, based on a flag indicating a boot mode.

In some embodiments, the processor is further configured to change a flag indicating a boot mode to a recovery mode skip based on the predetermined software binary having been recorded in the memory during the download mode.

In some embodiments, the processor is further configured to perform rebooting in the normal mode when the booting in the recovery mode has completed.

In some embodiments, the predetermined software binary is a software binary comprising an initialization option at booting.

In some embodiments, the initialization option comprises resizing of a predetermined partition of the memory, and the processor is further configured to resize a capacity of the predetermined partition during the booting in the normal mode, based on a capacity of the memory.

In some embodiments, the predetermined partition is a user data partition.

In some embodiments, the initialization option comprises an initialization command executable in the recovery mode, and the processor is further configured to execute the initialization command during the booting in the normal mode.

In some embodiments, the processor is further configured to delete the initialization option from the predetermined software binary when execution of the initialization option has completed.

According to an aspect of the present disclosure, there is provided a method of initializing an electronic device that includes recording, in a memory of the electronic device, software binaries received from an external device during a download mode. The method further includes, when the download mode has ended, performing booting in a normal mode using a bootloader based on a determination indicating that a predetermined software binary is present among the software binaries recorded in the memory, and performing booting in a recovery mode using the bootloader based on the determination indicating that the predetermined software binary is absent from among the software binaries recorded in the memory.

In some embodiments, the method further comprises, when the performing of the booting using the bootloader is initiated, selecting at least one of the normal mode and the recovery mode, based on a flag indicating a boot mode.

In some embodiments, the method further comprises changing a flag indicating a boot mode to a recovery mode skip based on the predetermined software binary having been recorded in the memory during the download mode.

In some embodiments, the method further comprises performing rebooting in the normal mode when the performing of the booting in the recovery mode has completed.

In some embodiments, the initialization option comprises resizing of a predetermined partition of the memory, and the performing of the booting in the normal mode comprises resizing a capacity of the predetermined partition, based on a capacity of the memory.

In some embodiments, the initialization option comprises an initialization command executable in the recovery mode, and the performing of the booting in the normal mode comprises executing the initialization command.

In some embodiments, the method further comprises deleting the initialization option from the predetermined software binary when execution of the initialization option has completed.

According to an aspect of the present disclosure, there is provided a non-transitory computer-readable storage medium storing computer-executable instructions for initializing an electronic device. The computer-executable instructions are configured, when executed by a processor of the electronic device, to cause the electronic device to record, in a memory of the electronic device, software binaries received from an external device during a download mode. The computer-executable instructions are further configured to, when the download mode has ended, perform booting in a normal mode using a bootloader based on a determination indicating that a predetermined software binary is present among the software binaries recorded in the memory, and to perform booting in a recovery mode using the bootloader based the determination indicating that the predetermined software binary is absent from among the software binaries recorded in the memory.

In some embodiments, the computer-executable instructions are further configured to, when the booting using the bootloader is initiated, select at least one of the normal mode and the recovery mode, based on a flag indicating a boot mode.

According to various embodiments of the present disclosure, an efficient method of initialization when an electronic device records a software binary in a memory may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
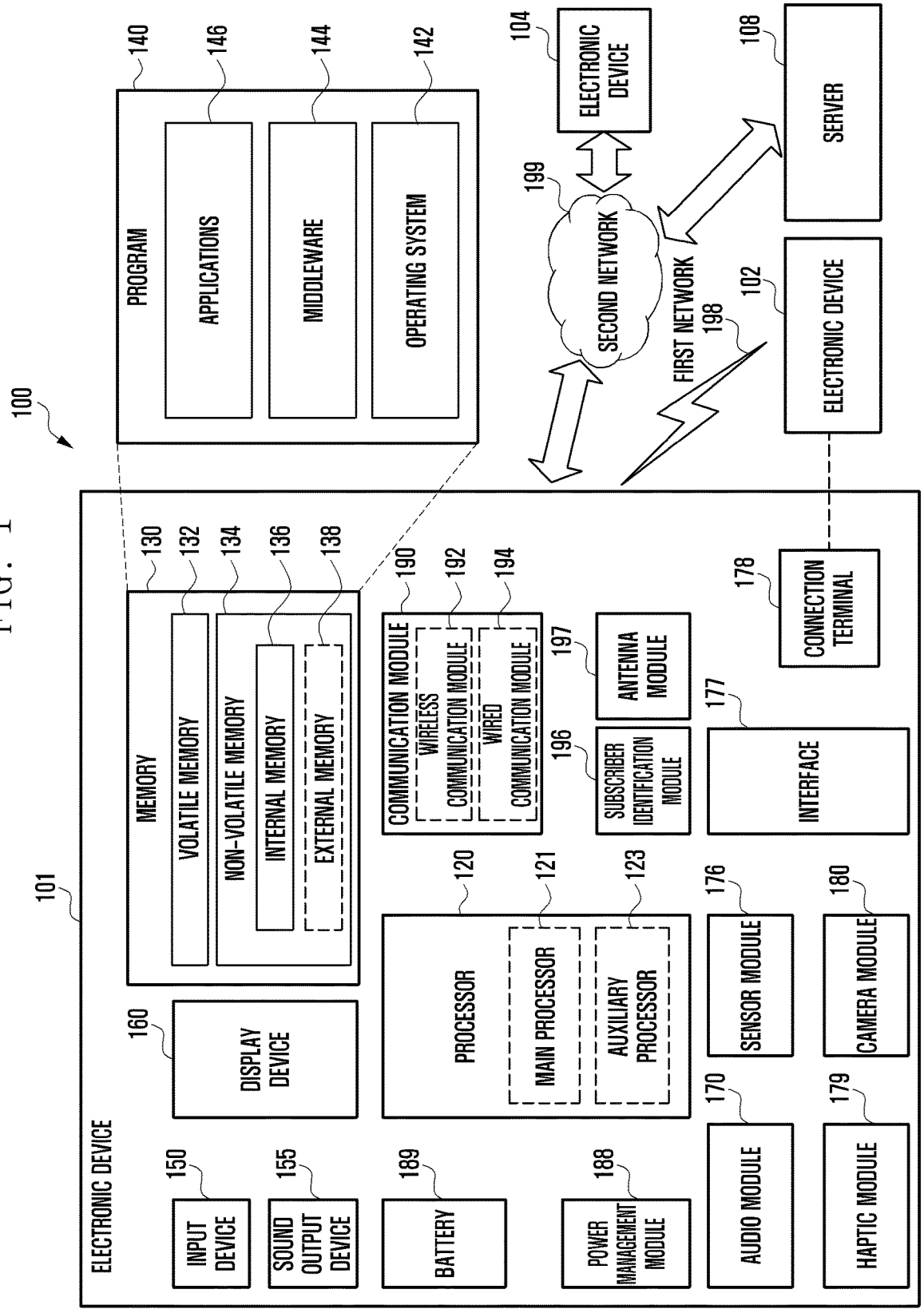
FIG. 1 is a block diagram of an electronic device in a network environment according to various embodiments.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
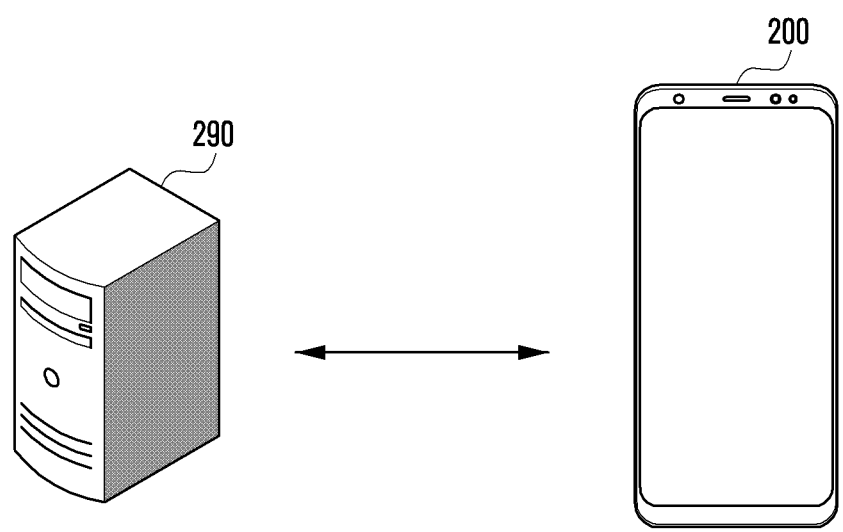
FIG. 2 illustrates an electronic device and an external device that executes a flash tool according to various embodiments.

FIG. 2 illustrates an electronic device and an external device that executes a flash tool according to various embodiments.

According to various embodiments, an electronic device 200 is a portable electronic device, such as a smartphone and a tablet PC, and may comprise at least some of the elements and/or functions of the electronic device 101 of FIG. 1.

According to various embodiments, the electronic device 200 may comprise one or more memories, and the memories may comprise a main memory (e.g., the volatile memory 132 of FIG. 1) and a storage (e.g., the non-volatile memory 134 of FIG. 1). The electronic device 200 may store various software binaries in the storage. For example, the software binaries may comprise, but not be limited to, system software, such as a bootloader, a kernel, an operating system, and a device driver.

According to various embodiments, the software binaries may be recorded in an area of the storage. Here or hereinafter, being able to be recorded may refer to being flashed to an area of the storage so as to be maintained as long as the same or different software binaries are written in the same storage area or no damage has occurred.

According to various embodiments, the electronic device 200 may store (or record) various software binaries, and each of the software binaries may be stored in separate partitions.

According to various embodiments, the electronic device 200 may record software binaries in a predetermined mode. Hereinafter, an operation mode for recording software binaries may be referred to as a download mode. The electronic device 200 may operate in the download mode when software (or firmware) or a part of a manufacturing process of the electronic device 200 is updated, so as to receive a software binary from an external device 290 connected by wire or wirelessly and record the same in the memory.

According to various embodiments, the external device 290 is a device capable of executing a flash tool, and a type of the external device 290 is not determined. For example, when an initial software binary is recorded during a manufacturing process of the electronic device 200, the external device 290 may be a computer device used in the manufacturing process, and the external device 290 may be a personal computer (PC) when a user records a software binary.

According to various embodiments, for example, after a printed board assembly (PBA) is completed via a surface mount technology (SMT) process on a printed circuit board (PCB) in the manufacturing process of the electronic device 200, software binaries may be recorded in the memory.

According to various embodiments, a user may execute the flash tool in the external device 290 (e.g., a PC) so as to download updated software binaries from an external server, and may record the updated software binaries in the memory of the electronic device 200 by connecting the electronic device 200 by wire (e.g., one or more cables) and/or wirelessly.

According to various embodiments, after recording (or flashing) the software binaries in the download mode, the electronic device 200 may need to go through a booting process to initialize the system. The electronic device 200 may be booted in a normal mode or a recovery mode, wherein the booting process may need to be performed in the normal mode to use a function, such as an application of the electronic device 200. That is, even if the electronic device 200 is booted in the recovery mode after recording a software binary, rebooting may be required in the normal mode in order to use the function of the electronic device 200.

Hereinafter, various embodiments for efficiently initializing the system after the electronic device 200 records, in the memory, the software binary received from the external device 290 are described.

Figure 3:
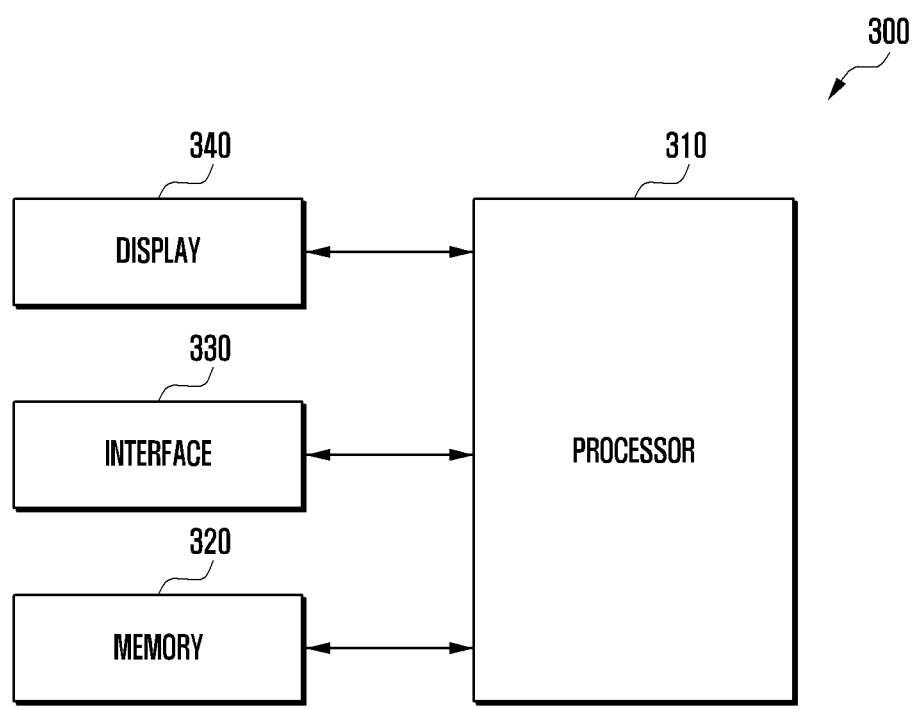
FIG. 3 is a block diagram of an electronic device according to various embodiments.

FIG. 3 is a block diagram of an electronic device 300 according to various embodiments.

Referring to FIG. 3, the electronic device 300 may comprise a processor 310, a memory 320, an interface 330, and a display 340, and may implement various embodiments of the present disclosure even if some of the illustrated elements are omitted or substituted. The electronic device 300 may comprise at least some of the elements and/or functions of the electronic device 100 of FIG. 1.

According to various embodiments, the display 340 may display an image and may be implemented as a touch screen. While the electronic device 300 is in a download mode or is being booted via normal booting or recovery booting, the display 340 may output an image determined for each mode (or state), and may display a progress bar indicating progress in each mode.

According to various embodiments, the interface 330 may support a connection to an external device (e.g., the external device 290 of FIG. 2). For example, the interface 330 may comprise a universal serial bus (USB) interface, and the electronic device 300 may be connected to the external device via a USB port so as to receive various data (e.g., a software binary).

According to various embodiments, the electronic device 300 may comprise one or more memories 320. The memories 320 may comprise a main memory and a storage. The main memory may comprise a volatile memory, such as a dynamic random access memory (DRAM), a static RAM (SRAM), or a synchronous dynamic RAM (SDRAM). The storage may comprise at least one of a one-time programmable read-only memory (OTPROM), a programmable read-only memory (PROM), an erasable programmable read-only memory (EPROM), an electrically erasable programmable read-only memory EEPROM), a mask read-only memory (ROM), a flash ROM, a flash memory, a hard drive, or a solid state drive (SSD). Software binaries received from the external device in the download mode may be recorded (or flashed) in the storage.

According to various embodiments, the processor 310 may be operatively, functionally, and/or electrically connected to each of the elements of the electronic device 300, such as the display 340, the interface 330, and the memory 320, so as to be configured to perform an operation related to control and/or communication of each element for data processing. The processor 310 may comprise at least some of the elements and/or functions of the processor 120 of FIG. 1.

The processor 310 may perform at least a portion of various embodiments, described in the present disclosure, for booting in a normal mode or a recovery mode by using a bootloader after the download mode ends. Operations of the processor 310 to be described later may be performed by loading instructions stored in the memory 320 (e.g., the storage).

According to various embodiments, the processor 310 may receive a software binary in the download mode from an external device (e.g., the external device 290 of FIG. 2) and record the same in the memory 320 (e.g., the storage). For example, if the electronic device 300 is connected to the external device via the interface 330 and the external device executes a flash tool, or a predetermined input for a hard key (e.g., a volume key and an end key) of the electronic device 300 is received, the download mode may be executed.

According to various embodiments, the download mode may be executed when a software binary is recorded in a manufacturing process of the electronic device 300 or when a software binary is updated while the electronic device 300 is in use. The software binary may comprise, but not be limited to, system software, such as a bootloader, a kernel, an operating system, and a device driver. The electronic device may divide the memory 320 into multiple partitions, and each software binary may be recorded in each partition.

According to various embodiments, when all software binaries are recorded in the memory 320 in the download mode, the processor 310 may perform booting using a bootloader. The bootloader may be a program for, while running in advance before an operating system is started, finishing tasks necessary for a kernel to be properly started and finally starting the operating system. In some embodiments, the bootloader may not use a file system, but may access a specific partition or address area of the memory 320 so as to execute a software binary recorded in the partition or address area.

According to various embodiments, a booting scheme of the bootloader may comprise normal booting and recovery booting. Under normal booting, the operating system may operate normally, and applications of the electronic device 300 may be initialized to be used. The recovery booting may be used for system configuration, factory reset, and the like, in which applications cannot be used (e.g., may be prevented from executing).

According to various embodiments, the processor 310 may perform normal booting or recovery booting, based on a flag indicating a boot mode.

According to various embodiments, when the download mode ends, the processor 310 may check whether a predetermined software binary exists (e.g., is present) among the software binaries recorded in the memory 320. The predetermined software binary may be a software binary having a record of an initialization option to be processed at initial booting. For example, the initialization option to be processed at booting may be recorded in misc.bin, but the option may be recorded in another software binary and/or another software binary having a different name.

According to various embodiments, the software binary having the record of the initialization option to be processed at booting may be generated using a binary generation tool (or generator) at a build time of the software binary.

According to various embodiments, a flag indicating that the boot mode in the download mode is the recovery mode and may be configured as a default, and when the software binary (e.g., misc.bin) having the record of the initialization option to be processed at booting is recorded in the memory 320, the processor 310 may change the flag to the normal mode (or a recovery mode skip). When software binaries are sequentially recorded in the memory 320, the bootloader may determine a software binary that is being recorded in a partition of the memory 320, and may identify whether the software binary having the record of the initialization option to be processed at booting is recorded in a specific partition, so as to change the flag.

According to various embodiments, if a predetermined software binary (e.g., the software binary (misc.bin) having the record of the initialization option to be processed at booting) is recorded in the memory 320, the processor 310 may perform booting in the normal mode by using the bootloader.

According to various embodiments, the processor 310 may perform initialization options recorded in the software binary while performing normal booting. The initialization options may comprise resizing of a predetermined partition, for example, resizing a user data partition (e.g., /data). The memory 320 (e.g., the storage) of the electronic device 300 may be divided into multiple partitions, including a user data partition in which user data including various applications may be stored. The processor 310 may resize the user data partition, based on the capacity of the memory 320 of the electronic device 300. For example, if a storage capacity of the memory 320 is 256 GB, the user data partition may be resized to 256 GB, and if the storage capacity of the memory 320 is 512 GB, the user data partition may be resized to 512 GB. Accordingly, the size of the user data partition may be appropriately configured according to the storage capacity.

According to various embodiments, the initialization options may further comprise various initialization commands. For example, the initialization commands may include delete_apn_change, and in this case, the processor 310 may initialize or delete an apn-related file. Examples of initialization commands that may be recorded in a predetermined software binary are not limited thereto, and various initialization commands that may be executed in the recovery mode may be included.

According to various embodiments, when execution of the initialization option recorded in the predetermined software binary is completed, the processor 310 may delete the initialization option recorded in the corresponding software binary (e.g., misc.bin). Accordingly, the recorded initialization options may not be executed at rebooting.

As described above, various operations related to device initialization may be performed also during normal booting, and thus time can be reduced when compared to performing recovery booting and then performing rebooting in the normal mode.

According to various embodiments, if the predetermined software binary (e.g., the software binary (misc.bin) having the record of the initialization option to be processed at booting) is not recorded in the memory 320, booting may be performed in the recovery mode by using the bootloader. When booting is performed in the recovery mode, the processor 310 may resize or format the user data partition in the recovery mode, and may execute initialization commands comprised in a customer software customization (CSC) image. The initialization commands of the CSC image may exist in cache.img (/cache/recovery/command).

According to various embodiments, when all initialization commands are executed in the recovery mode, the processor 310 may perform rebooting in the normal mode.

Figure 4:
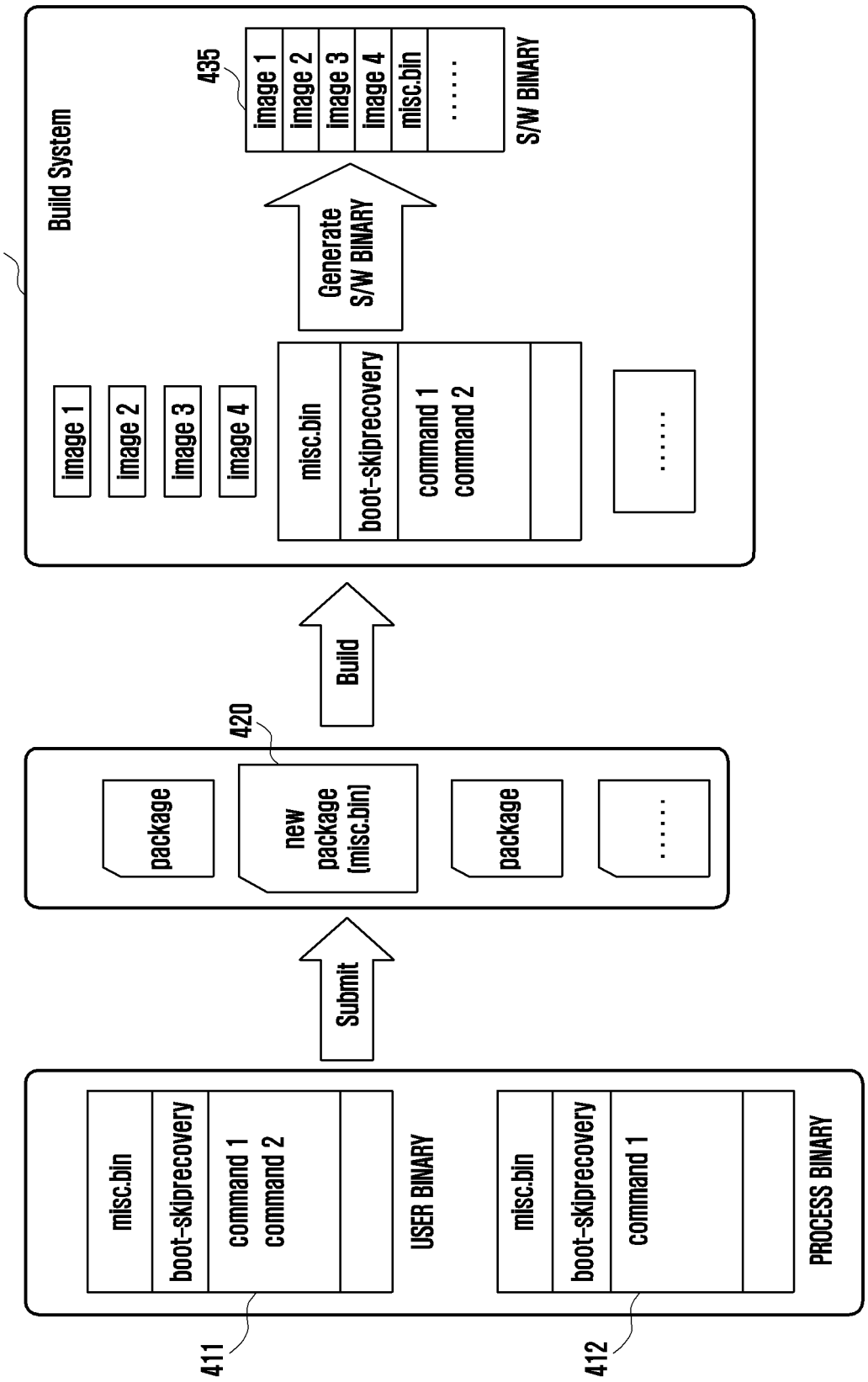
FIG. 4 illustrates a build system for a software binary according to various embodiments.

FIG. 4 illustrates a build system for a software binary according to various embodiments.

The illustrated build system 430 may be a system for generating a predetermined binary (e.g., a software binary (misc.bin) having a record of an initialization option to be processed at booting) for normal boot initialization according to various embodiments.

Referring to FIG. 4, a user initialization binary 411 for a user binary in which an initialization option is recorded and a process initialization binary 412 for a process binary may be generated separately on the build system. For example, the build system (or a developer of a software binary) may generate the process initialization binary 412 including an initialization option (e.g., command 1) to be recorded in an electronic device during a manufacturing process of the electronic device, and may generate the user initialization binary 411 including initialization options (e.g., command 1 and command 2) to be used when the electronic device is updated while in use. According to various embodiments, the user initialization binary 411 may further include, compared to the process initialization binary 412, an initialization command (e.g., command 2, customer service customization (CSC)) that is not used in the manufacturing process.

The process initialization binary 412 and the user initialization binary 411 may, for normal booting initialization, be included in the software binary having the record of the initialization option to be processed at booting. For each of software binary types (e.g., the process binary and the user binary), the initialization commands may be separated and a binary generator may be implemented in consideration of scalability.

The binary in which the initialization option is recorded may be packaged together with other binaries. In reference numeral 420, the process binary and the user binary may be packaged separately.

In reference numeral 435, the build system 430 may generate software binaries comprising final other binary images and binaries (misc.bin) in which the initialization option is recorded, for example, the process initialization binary 412 and the user initialization binary 411.

Figure 5:
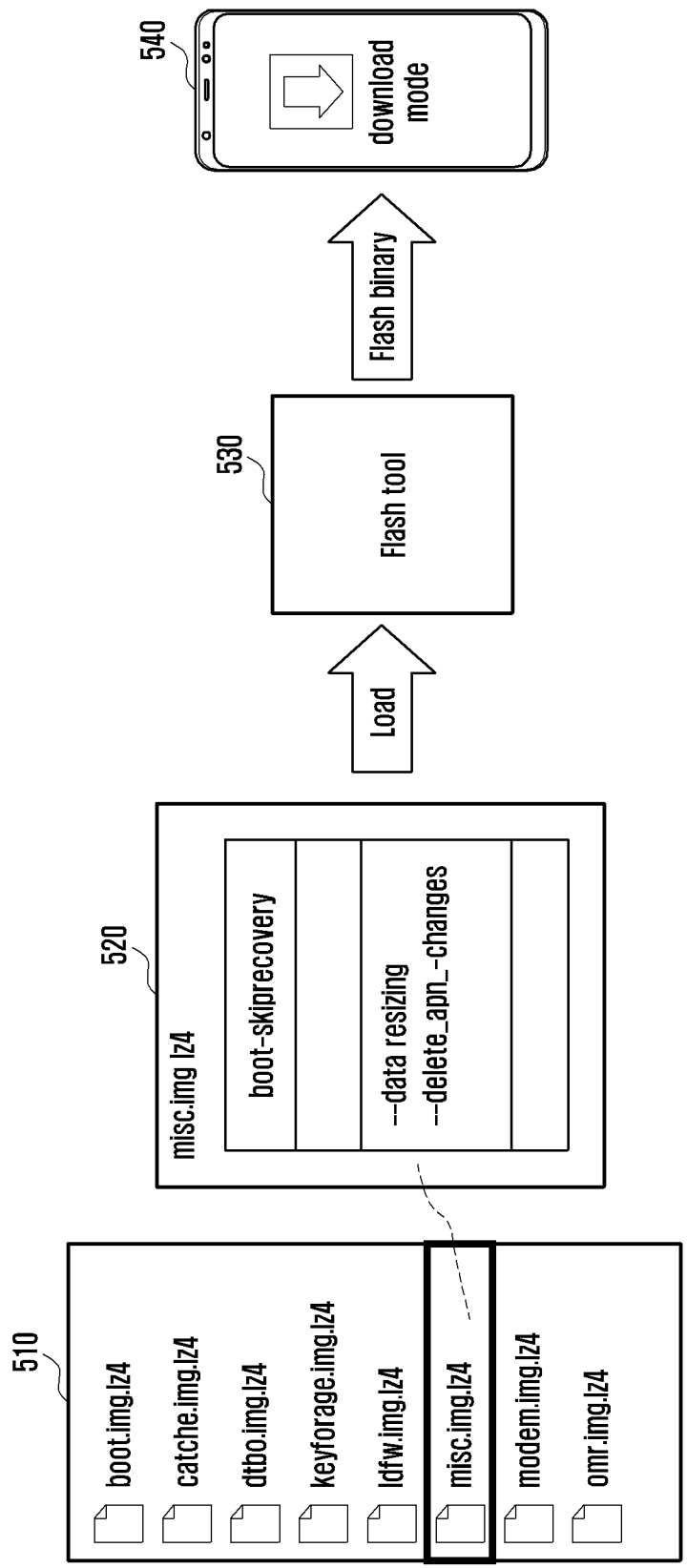
FIG. 5 illustrates an operation in a download mode of an electronic device according to various embodiments.

FIG. 5 illustrates an operation in a download mode of an electronic device according to various embodiments.

According to various embodiments, an electronic device (e.g., the electronic device 300 of FIG. 3) may operate in the download mode during a part of a manufacturing process or software update of the electronic device, so as to receive a software binary from an external device (e.g., the external device 290 of FIG. 2) connected by wire (e.g., cables) or wirelessly and record the received software binary in a memory.

The external device may receive the software binary to be recorded in the electronic device from an external server by using a flash tool 530. The flash tool 530 may comprise a binary (e.g., misc.bin) 520 in which an initialization option is recorded. In addition, the flash tool 530 may receive various software binaries comprising, but not limited to, system software, such as a bootloader, a kernel, an operating system, and a device driver.

When connected to the external device via an interface, the electronic device may operate in the download mode in reference numeral 540, and an operation other than an operation of receiving the software binary from the flash tool of the external device and recording the same in the memory may not be performed in the download mode. The electronic device may display a progress bar indicating the progress of the download mode on a display.

Figure 6:
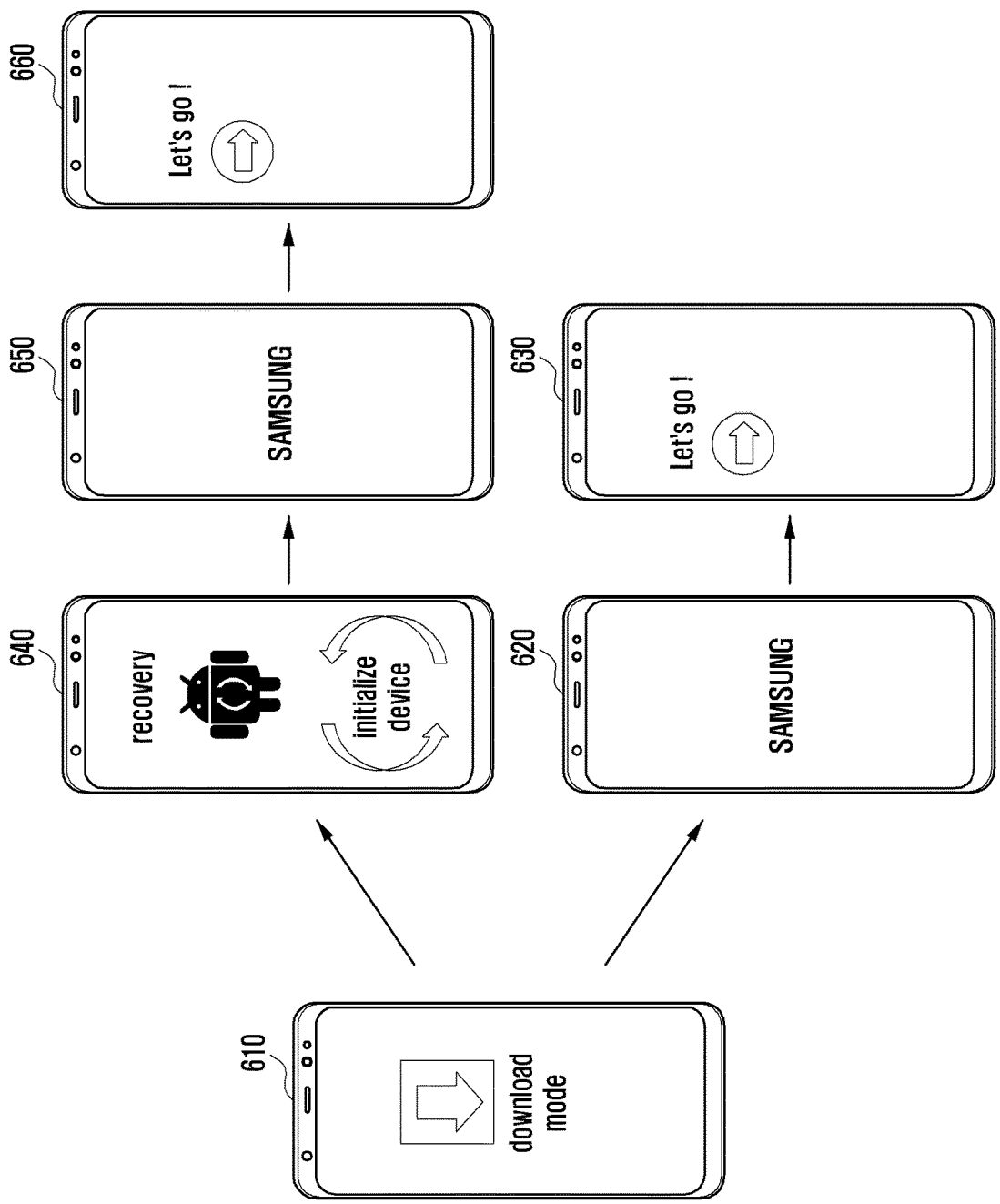
FIG. 6 illustrates a booting method of an electronic device according to various embodiments.

FIG. 6 illustrates a booting method of an electronic device according to various embodiments.

According to various embodiments, in reference numeral 610, an electronic device may record a software binary received from an external device in a memory in a download mode.

According to various embodiments, the electronic device may receive the software binary from the external device (e.g., the external device of FIG. 2) in the download mode and record the same in the memory (e.g., the storage). For example, if the electronic device is connected to the external device via an interface, and the external device executes a flash tool, or a predetermined input for a hard key (e.g., a volume key and an end key) of the electronic device is received, the download mode may be executed. The electronic device may not execute other functions in the download mode, and an image indicating the download mode may be displayed on a display.

According to various embodiments, when the download mode ends, the electronic device may check whether a predetermined software binary exists (e.g., is present) among the software binaries recorded in the memory. The predetermined software binary is a software binary (e.g., misc.bin) comprising an initialization option at booting, and when the software binary is recorded in a specific partition, a bootloader may change a flag indicating a boot mode to a normal mode or a recovery mode skip.

According to various embodiments, when the software binary including the initialization option at booting is recorded, the electronic device may perform booting in the normal mode. In reference numeral 620, the electronic device may perform the initialization option recorded in the corresponding software binary while booting in the normal mode. The initialization option may include resizing of a predetermined partition, and may further include various initialization commands. In reference numeral 630, when normal booting is completed, the electronic device may output a predetermined screen and may execute various applications according to a user input.

According to various embodiments, when the software binary including the initialization option at booting is not recorded, the electronic device may perform booting in the recovery mode. In reference numeral 640, when the booting is performed in the recovery mode, the processor may resize or format a user data partition in the recovery mode, and may execute initialization commands included in a customer software customization (CSC) image.

According to various embodiments, when booting in the recovery mode is completed, the electronic device may be rebooted in the normal mode. In this case, in reference numeral 650, since no software binary including the initialization option at booting is recorded, the initialization options are not executed during the normal booting. In reference numeral 660, when the normal booting is completed, the electronic device may output a predetermined screen and may execute various applications according to a user input.

The electronic device 300 according to various embodiments may include a memory 320, and a processor 310 operatively connected to the memory 320, wherein the processor 310 is configured to record software binaries received from an external device in the memory 320 in a download mode, perform, when the download mode ends, booting in a normal mode by using a bootloader if a predetermined software binary exists (e.g., is present) among the software binaries recorded in the memory 320, and perform booting in a recovery mode by using the bootloader if the predetermined software binary does not exist (e.g., is absent).

According to various embodiments, the processor 310 may be configured to, when booting is initiated using the bootloader, select either the normal mode or the recovery mode, based on a flag indicating a boot mode.

According to various embodiments, the processor 310 may be configured to change a flag indicating a boot mode to a recovery mode skip when the predetermined software binary is recorded in the memory 320 in the download mode.

According to various embodiments, the processor 310 may be configured to perform rebooting in the normal mode when booting in the recovery mode is completed.

According to various embodiments, the predetermined software binary may be a software binary including an initialization option at booting.

According to various embodiments, the initialization option may include resizing of a predetermined partition, and the processor 310 may be configured to resize capacity of the predetermined partition during the booting in the normal mode, based on capacity of the memory 320.

According to various embodiments, the predetermined partition may be a user data partition.

According to various embodiments, the initialization option may include an initialization command executable in the recovery mode, and the processor 310 may be configured to execute the initialization command during the booting in the normal mode.

According to various embodiments, the processor 310 may be configured to delete the initialization option from the predetermined software binary when the execution of the initialization option is completed.

According to various embodiments, the electronic device 300 may further comprise an interface 330 configured to support a data connection with the external device, and may receive the software binary from the external device via the interface 330 in the download mode.

Figure 7:
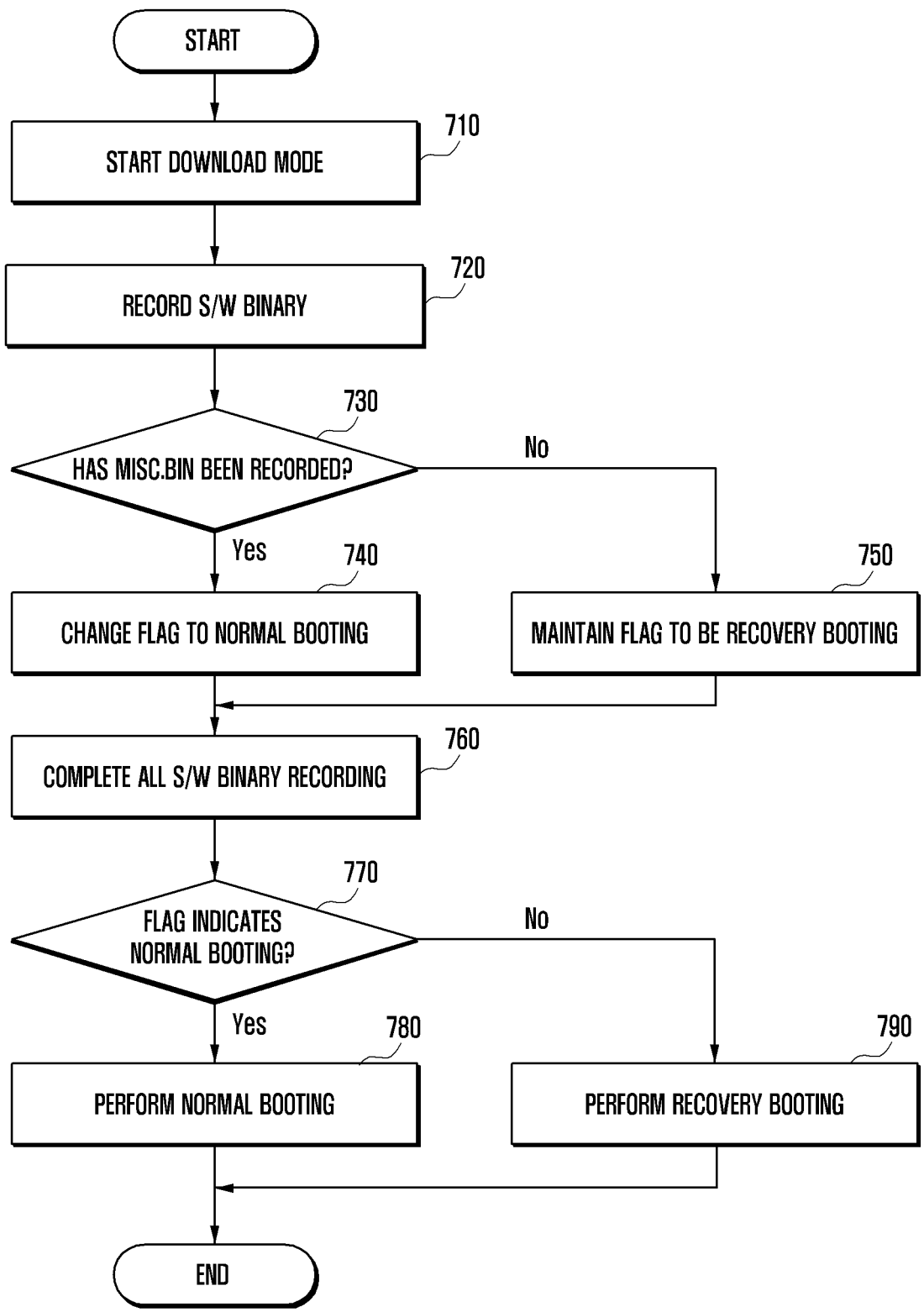
FIG. 7 is a flowchart of a method of initializing an electronic device according to various embodiments.

FIG. 7 is a flowchart of a method of initializing an electronic device according to various embodiments.

In operation 710, an electronic device (e.g., the electronic device 300 of FIG. 3) may start a download mode. The download mode may be executed when a software binary is recorded in a manufacturing process of the electronic device or when a software binary is updated using a flash tool when the electronic device is in use.

In operation 720, the electronic device may record a software binary in a memory in the download mode. The software binary may comprise, but not be limited to, system software, such as a bootloader, a kernel, an operating system, and a device driver. The memory may be divided into multiple partitions, and each software binary may be recorded in each partition.

In operation 730, when the download mode ends, the electronic device may check whether a predetermined software binary (e.g., is present) among the software binaries recorded in the memory. The predetermined software binary may be a software binary having a record of an initialization option to be processed at initial booting. For example, the initialization option to be processed at booting may be recorded in misc.bin, but the option may be recorded in another software binary and/or another software binary having a different name.

When the software binary (e.g., misc.bin) in which the initialization option is recorded is recorded, the electronic device may change, in operation 740, a flag indicating a boot mode to normal booting (or a recovery mode skip).

If the software binary (e.g., misc.bin) in which the initialization option is recorded is not recorded, the electronic device may maintain, in operation 750, a flag indicating a boot mode to be a recovery mode determined as a default.

In operation 760, when recording of the software binary received from the external device is completed, the electronic device may end the download mode.

In operation 770, the electronic device may identify whether the flag indicating a boot mode indicates a normal boot mode.

If the flag indicating a boot mode indicates the normal boot mode (or a recovery mode skip), the electronic device may perform normal booting using a bootloader in operation 780. The electronic device may perform initialization options recorded in corresponding software binaries while booting in the normal mode. The initialization option may include resizing of a predetermined partition, and may further include various initialization commands.

If the flag indicating a boot mode indicates the recovery mode, the electronic device may perform recovery booting using the bootloader in operation 790. The electronic device may execute an initialization command comprised in a customer software customization (CSC) image while being booted in the recovery mode. The electronic device may be rebooted in the normal mode when the recovery booting is completed.

Figure 8:
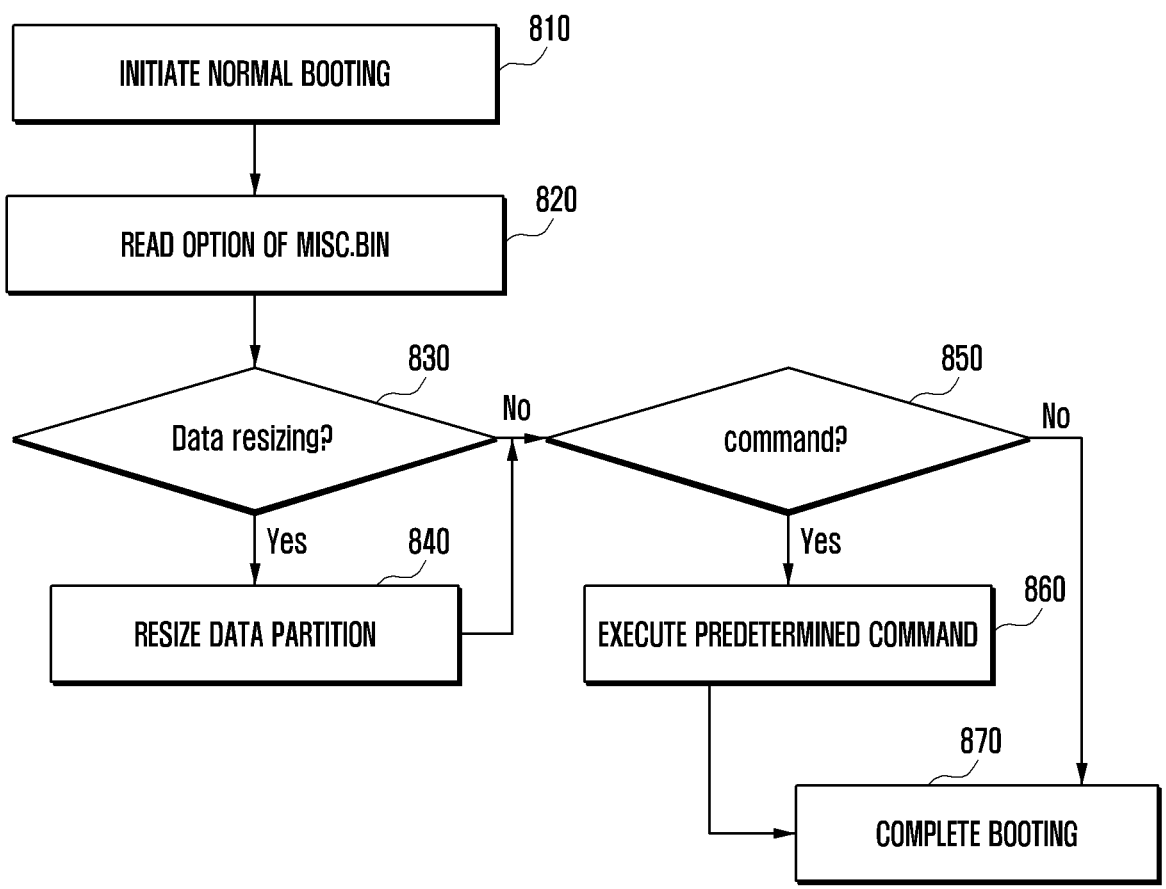
FIG. 8 is a flowchart of a method of initializing an electronic device according to various embodiments.

FIG. 8 is a flowchart of a method of initializing an electronic device according to various embodiments.

FIG. 8 illustrates an operation after a download mode ends when an electronic device (e.g., the electronic device 300 of FIG. 3) has recorded a software binary, in which an initialization option is recorded, in a memory in the download mode.

In operation 810, when the download mode is completed, the electronic device may check whether the software binary in which an initialization option is recorded exists, and may initiate normal booting using a bootloader.

In operation 820, the electronic device may identify initialization options recorded in the software binary (e.g., misc.bin).

In operation 830, the electronic device may identify whether the initialization option includes resizing of a predetermined partition (e.g., a user data partition).

If the initialization option includes resizing of a user data partition, the electronic device may resize the user data partition in operation 840, based on capacity of the memory of the electronic device. For example, if a storage capacity of the memory is 256 GB, the user data partition may be resized to 256 GB, and if the storage capacity of the memory is 512 GB, the user data partition may be resized to 512 GB. Accordingly, the size of the user data partition may be appropriately configured according to the storage capacity.

In operation 850, the electronic device may identify initialization commands recorded in the software binary (e.g., misc.bin).

In operation 860, the electronic device may execute the initialization commands. For example, the initialization commands may include delete_apn_change, and in this case, the electronic device may initialize or delete an apn-related file. Examples of initialization commands that may be recorded in a predetermined software binary are not limited thereto, and various initialization commands that may be executed in the recovery mode may be included.

When the execution of the initialization commands is completed or if there is no initialization command recorded in the software binary, the electronic device may complete normal booting in operation 870. When the normal booting is completed, various applications may be executed according to a user input.

A method of initializing the electronic device 300 according to various embodiments may include recording software binaries received from an external device in a memory 320 in a download mode, performing, when the download mode ends, booting in a normal mode by using a bootloader if a predetermined software binary exists (e.g., is present) among the software binaries recorded in the memory 320, and performing booting in a recovery mode by using the bootloader if the predetermined software binary does not exist (e.g., is absent).

According to various embodiments, the method may further include, when booting is initiated using the bootloader, selecting either the normal mode or the recovery mode, based on a flag indicating a boot mode.

According to various embodiments, the method may further include changing a flag indicating a boot mode to a recovery mode skip when the predetermined software binary is recorded in the memory 320 in the download mode.

According to various embodiments, the method may further include performing rebooting in the normal mode when booting in the recovery mode is completed.

According to various embodiments, the predetermined software binary may be a software binary including an initialization option at booting.

According to various embodiments, the initialization option may include resizing of a predetermined partition, and the performing of booting in the normal mode may include resizing capacity of the predetermined partition during the booting in the normal mode, based on capacity of the memory 320.

According to various embodiments, the predetermined partition may be a user data partition.

According to various embodiments, the initialization option may include an initialization command executable in the recovery mode, and the performing of booting in the normal mode may include executing the initialization command during the booting in the normal mode.

According to various embodiments, the method may further include deleting the initialization option from the predetermined software binary when the execution of the initialization option is completed.

According to various embodiments, the recording of the software binaries received from the external device in the download mode in the memory 320 may include receiving the software binaries from the external device connected via the interface 330.

What is claimed is:

1. An electronic device, comprising:
   a memory; and
   a processor operatively connected to the memory, wherein the processor is configured to:
   record, in the memory, software binaries received from an external device during a download mode; and
   when the download mode has ended:
   perform booting in a normal mode using a bootloader based on a determination indicating that a predetermined software binary is present among the software binaries recorded in the memory; and
   perform booting in a recovery mode using the bootloader based on the determination indicating that the predetermined software binary is absent from among the software binaries recorded in the memory,
   wherein the predetermined software binary is prevented from executing in the recovery mode.

2. The electronic device of claim 1, wherein the processor is further configured to, when the booting using the bootloader is initiated, select at least one of the normal mode and the recovery mode, based on a flag indicating a boot mode.

3. The electronic device of claim 1, wherein the processor is further configured to change a flag indicating a boot mode to a recovery mode skip based on the predetermined software binary having been recorded in the memory during the download mode.

4. The electronic device of claim 1, wherein the processor is further configured to perform rebooting in the normal mode when the booting in the recovery mode has completed.

5. The electronic device of claim 1, wherein the predetermined software binary is a software binary comprising an initialization option at booting.

6. The electronic device of claim 5, wherein
   the initialization option comprises resizing of a predetermined partition of the memory, and
   the processor is further configured to resize a capacity of the predetermined partition during the booting in the normal mode, based on a capacity of the memory.

7. The electronic device of claim 6, wherein the predetermined partition is a user data partition.

8. The electronic device of claim 5, wherein
   the initialization option comprises an initialization command executable in the recovery mode, and the processor is further configured to execute the initialization command during the booting in the normal mode.

9. The electronic device of claim 5, wherein the processor is further configured to delete the initialization option from the predetermined software binary when execution of the initialization option has completed.

10. A method of initializing an electronic device, comprising:
recording, in a memory of the electronic device, software binaries received from an external device during a download mode;
when the download mode has ended:
determining whether a predetermined software binary is present or absent from among the software binaries recorded in the memory;
performing booting in a normal mode using a bootloader based on the determining that the predetermined software binary is present; and
performing booting in a recovery mode using the bootloader based on the determining that the predetermined software binary is absent,
wherein the predetermined software binary is prevented from executing in the recovery mode.

11. The method of claim 10, further comprising:
when the performing of the booting using the bootloader is initiated, selecting at least one of the normal mode and the recovery mode, based on a flag indicating a boot mode.

12. The method of claim 10, further comprising:
changing a flag indicating a boot mode to a recovery mode skip based on the predetermined software binary having been recorded in the memory during the download mode.

13. The method of claim 10, further comprising:
performing rebooting in the normal mode when the performing of the booting in the recovery mode has completed.

14. The method of claim 10, wherein the predetermined software binary is a software binary comprising an initialization option at booting.

15. The method of claim 14, wherein
the initialization option comprises resizing of a predetermined partition of the memory, and
the performing of the booting in the normal mode comprises resizing a capacity of the predetermined partition, based on a capacity of the memory.

16. The method of claim 15, wherein the predetermined partition is a user data partition.

17. The method of claim 14, wherein
the initialization option comprises an initialization command executable in the recovery mode, and
the performing of the booting in the normal mode comprises executing the initialization command.

18. The method of claim 14, further comprising:
deleting the initialization option from the predetermined software binary when execution of the initialization option has completed.

19. A non-transitory computer-readable storage medium storing computer-executable instructions for initializing an electronic device, the computer-executable instructions being configured, when executed by a processor of the electronic device, to cause the electronic device to:
record, in a memory of the electronic device, software binaries received from an external device during a download mode; and
when the download mode has ended:
determine whether a predetermined software binary is present or absent from among the software binaries recorded in the memory;
perform booting in a normal mode using a bootloader based on a determination that the predetermined software binary is present; and
perform booting in a recovery mode using the bootloader based on the determination that the predetermined software binary is absent,
wherein the predetermined software binary is prevented from executing in the recovery mode.

20. The non-transitory computer-readable storage medium of claim 19, wherein the computer-executable instructions are further configured to further cause the electronic device to:
when the booting using the bootloader is initiated, select at least one of the normal mode and the recovery mode, based on a flag indicating a boot mode.

* * * * *